United States Patent [19]

Langley

[11] 4,343,446
[45] Aug. 10, 1982

[54] V/STOL AIRCRAFT

[75] Inventor: Kenneth R. Langley, Wotton-Under-Edge, England

[73] Assignee: Rolls Royce Limited, London, England

[21] Appl. No.: 144,937

[22] Filed: Apr. 29, 1980

[30] Foreign Application Priority Data

May 29, 1979 [GB] United Kingdom ............... 7918674

[51] Int. Cl.³ .................. B64C 29/00; B64C 15/00
[52] U.S. Cl. .................. 244/12.5; D12/335; 244/15; 244/73 R
[58] Field of Search ............. 244/12.1, 12.4, 12.5, 244/13, 23 D, 52, 73 R; D12/326, 330, 333, 335

[56] References Cited

U.S. PATENT DOCUMENTS

| | | | |
|---|---|---|---|
| D. 162,517 | 3/1951 | Burnelli | D12/335 |
| D. 239,274 | 3/1976 | Snyder | D12/335 |
| 2,885,159 | 5/1959 | Ashwood | 244/12.5 |
| 2,928,238 | 3/1960 | Hawkins | 244/52 |
| 2,951,660 | 9/1960 | Giliberty | 244/23 D |
| 3,056,258 | 10/1962 | Marchant et al. | 244/12.5 |
| 3,089,667 | 5/1963 | Gosslau et al. | 244/12.4 |
| 3,096,954 | 7/1963 | Bauger et al. | 244/23 D |
| 3,193,217 | 7/1965 | Marchant et al. | 244/23 D |
| 3,258,206 | 6/1966 | Simonson | 244/12.5 |
| 3,330,500 | 7/1967 | Winborn | 244/12.5 |

FOREIGN PATENT DOCUMENTS

| | | | |
|---|---|---|---|
| 1456026 | 1/1969 | Fed. Rep. of Germany | 244/12.5 |
| 2833678 | 2/1979 | Fed. Rep. of Germany | 244/12.5 |
| 1563813 | 4/1980 | United Kingdom | 244/13 |

Primary Examiner—Charles E. Frankfort
Attorney, Agent, or Firm—Stevens, Davis, Miller & Mosher

[57] ABSTRACT

A twin-engined VTOL/STOL aircraft comprising a rearwardly bifurcated fuselage 10 is proposed which in the event of failure of one engine 20 will allow the other engine 20 to produce a thrust which is not assymetric relative to the longitudinal axis of the aircraft. The fuselage 10 comprises a central front nose portion 11 and two side mounted engine nacelles 13, 14 which extend rearwardly to define spaced tail booms 15, 16. The engines 20 are preferably by-pass gas turbine engines in which the turbine exhaust gases are discharged through one or more nozzles 28 to the rear of the nose portion 11 between the tail booms 15, 16 on the centerline of the aircraft. The by-pass air is discharged through one or more nozzles 27 adjacent the longitudinal center-line of the aircraft. The nozzles 27, 28 are either swivellable, or other devices 34, are provided to vary the direction of thrust from the nozzles.

20 Claims, 6 Drawing Figures

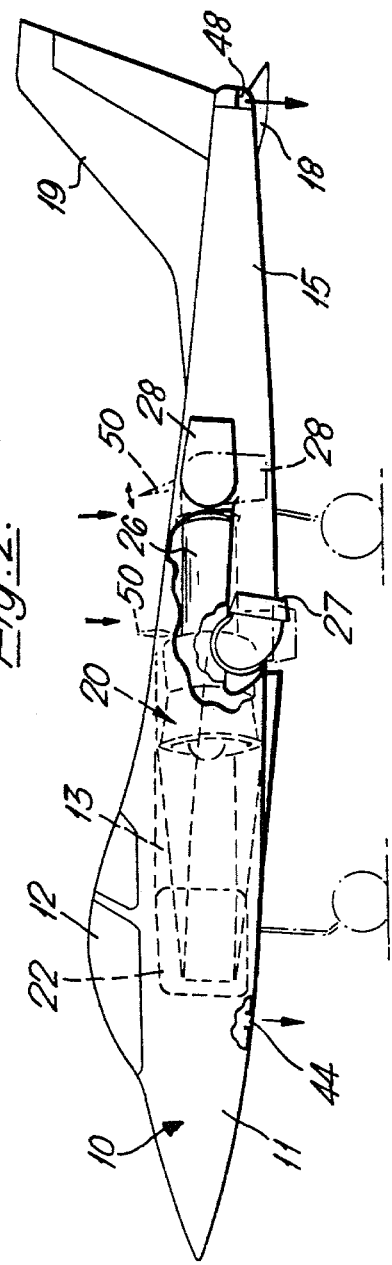
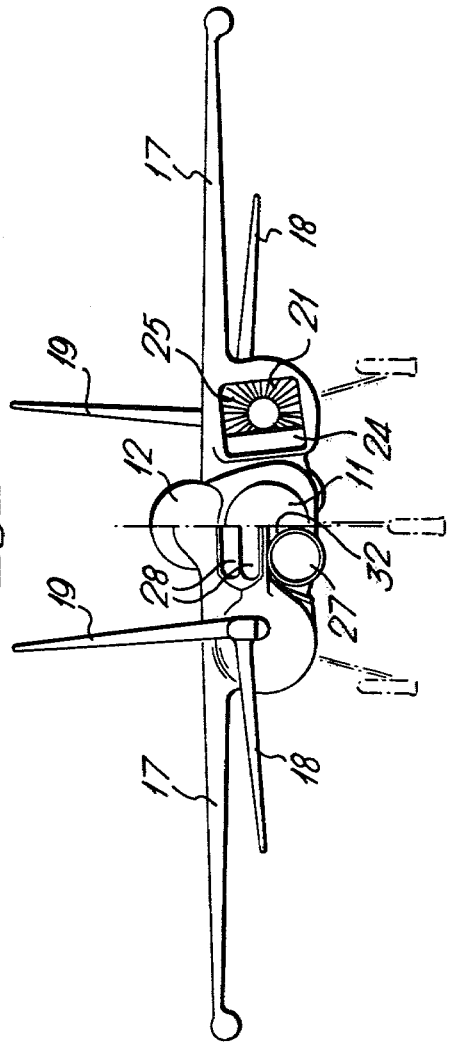

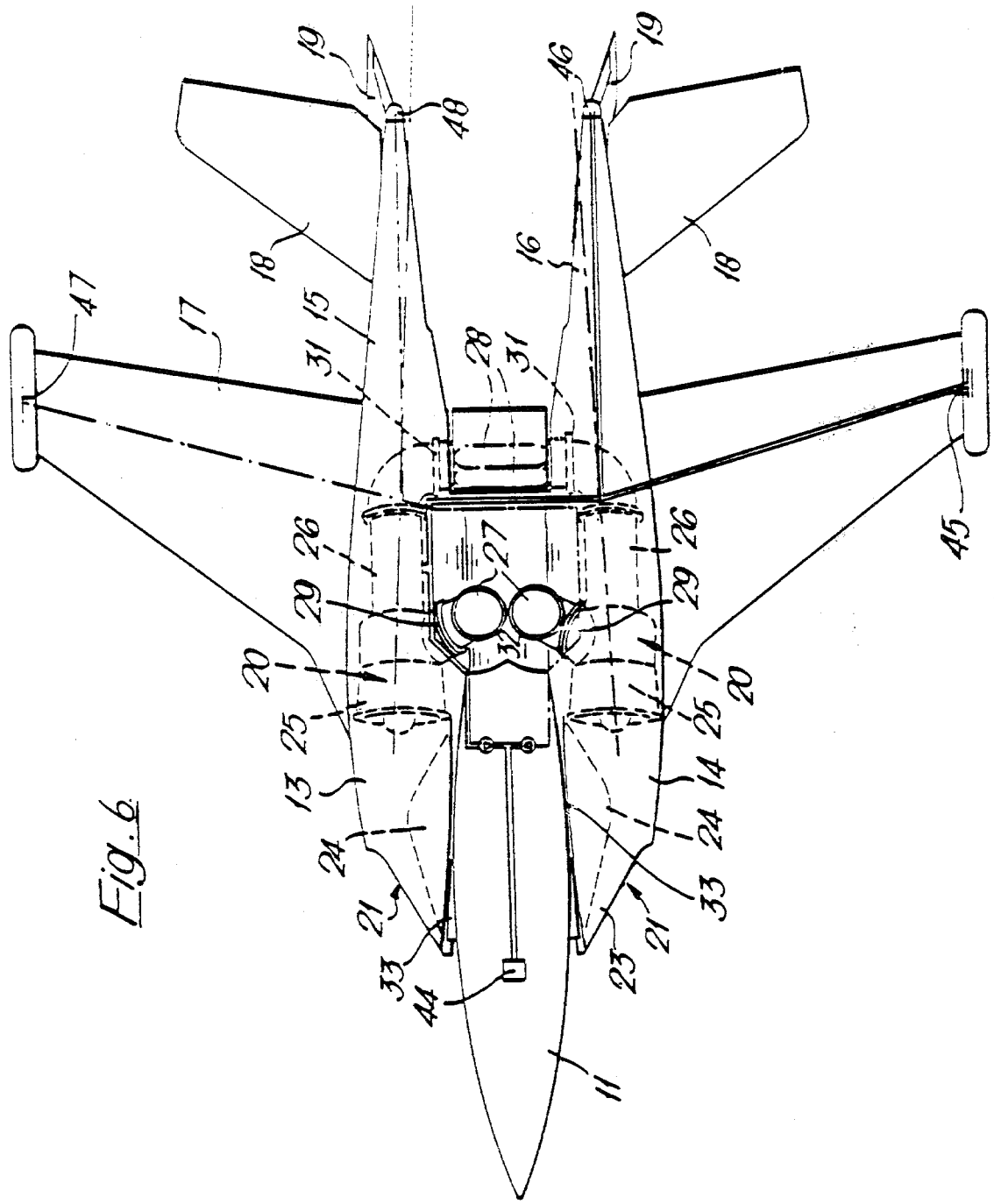

V/STOL AIRCRAFT

DESCRIPTION

This invention relates to aircraft capable of short or vertical take-off and landing and has particular reference to an aircraft provided with two engines.

Many varied proposals have been made for aircraft capable of short or vertical take-off and landing and most have concerned aircraft provided with only a single engine. Aircraft having two engines offer the possibility of improved performance relative to single-engined aircraft but also give rise to further problems and complexity.

One problem that has given rise to particular concern is the stability of the aircraft when maneuverability at low or zero forward speeds should one engine suddenly fail. The resulting assymetric thrust would be likely to give rise to a catastrophic accident.

One aircraft that has already been proposed (see, for example, U.S. Pat. No. 3,193,217) has two bypass engines mounted side-by-side and the bypass air flow and gas generator turbine exhaust flows of each of the two engines are discharged through respective swivellable nozzles. The swivellable nozzles are so arranged that the turbine exhaust of the right-hand engine is discharged to the left-hand side of the left-hand engine, and the bypass air of the right-hand engine is discharged to the right-hand side of the aircraft. A similar "cross-over" arrangement pertains to the left-hand engine. This means that on failure of any one of the engines the remaining engine does not produce significant assymetric thrust. However, such an arrangement has disadvantages because the need to cross-over the exhaust jet pipes of the engines can produce performance losses and make removal of the engines difficult.

It is also generally desirable to produce an aircraft with a supersonic capability and achievement of this is hindered by the provision of swivellable nozzles because they significantly increase the profile drag of the aircraft. This would be a significant problem with the above-mentioned aircraft arrangement.

It is also desirable that modern military aircraft should be constructed to have a relatively small infrared signature so as to make them less susceptible to infra-red seeking missiles. The nozzles of the aircraft described in the previously mentioned U.S. Pat. No. 3,193,217 are disadvantageously positioned in this respect.

One advantage of V-STOL aircraft is their supreme maneuverability and, despite modern aids, this needs to be matched with the position of the pilot which affords him good visibility of the surround terrain and airspace. The positioning of the two engines required by U.S. Pat. No. 3,193,217 means that good visibility is achieved at the expense of lengthening the fuselage and thus unduly increasing the weight of the aircraft.

The present invention seeks to provide an aircraft having two engines which are so arranged that the problems of assymetric thrust on failure of one engine are largely avoided. Further desirable objects of the invention are that the infra-red signature of the aircraft is kept relatively low, the high speed drag penalties associated with the provision of swivellable nozzles are kept relatively low, and the pilot is situated in a position affording good visibility.

According to the present invention there is provided an aircraft capable of vertical or short take-off and landing comprising:

a rearwardly bifurcated fuselage which comprises a front nose portion extending along the longitudinal centre-line axis of the aircraft and two spaced engine nacelles which extend rearwards effectively to constitute two spaced tail-booms;

a gas turbine engine located within each nacelle;

one or more turbine exhaust nozzles located to the rear of the nose portion between the tail-boom through which an efflux of gases from the engines is discharged to provide a propulsive thrust; and means to vary the direction of the thrust.

Preferably, the engines are bypass gas turbine engines, one or more bypass air discharge nozzles are provided at a region adjacent the longitudinal centerline of the aircraft, through which bypass air is discharged to provide a propulsive thrust, and means are provided to vary the direction of the thrust produced by the discharge of the bypass air.

Each engine may have its own turbine exhaust nozzle, in which case, the two turbine exhaust nozzles are positioned adjacent each other. The turbine exhaust gases from the engines may be discharged along side each other on either side of the center-line of the aircraft or the nozzles may lie one above the other spanning across the center-line of the aircraft. Alternatively, the combined efflux of gases from both engines may be discharged through a common turbine exhaust nozzle.

Similarly, each bypass gas turbine engine may have its own nozzle means for discharging the bypass flow of the engine, in which case, the bypass air discharge nozzles are positioned adjacent each other. The bypass flows from the engines may be discharged on either side of the center-line of the aircraft or the bypass air discharge nozzles may lie one above the other across the center-line of the aircraft. Alternatively, the combined bypass air flows from both engines may be discharged through a common nozzle. In the case where each engine has its own turbine exhaust nozzle and, or, its own bypass air nozzle, means may be provided for swivelling both turbine exhaust nozzles together in unison and, or, both bypass air nozzles in unison. All nozzles may be moved together in unison.

If desired the turbine exhaust nozzle, or nozzles, and, or, the bypass air discharge nozzle, or nozzles, may be fixed and means provided for varying the direction of thrust produced by the respective nozzle or nozzles.

The invention will now be described, by way of an example only, with reference to the accompanying drawings in which:

FIG. 2 is a schematic longitudinal section through the aircraft of FIG. 1 taken along line II—II of FIG. 1;

FIG. 3 is a compound view of the aircraft of FIGS. 1 and 2; the righthand side is a view of the front of the aircraft and the lefthand side is a view of the rear of the aircraft;

FIG. 6, is an underside plan view of an aircraft of the present invention which shows an alternative design of the engine position.

Figure 1:
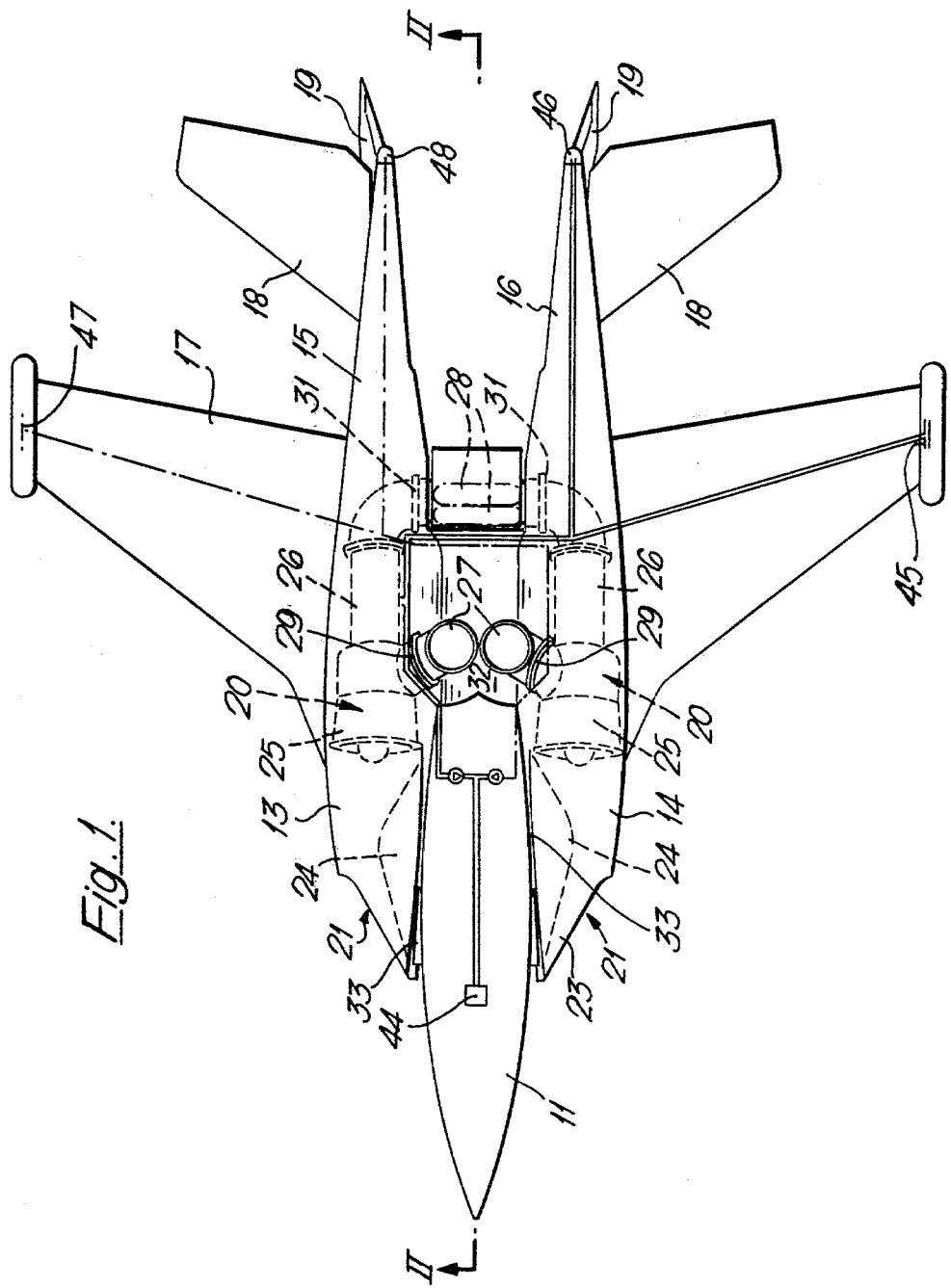
FIG. 1 is an underside plan view of an aircraft according to the present invention.

Referring to FIGS. 1 to 3 there is shown an aircraft comprising a rearwardly bifurcated fuselage 10 which comprises a front nose portion 11 incorporating a cockpit 12, and two side mounted engine nacelles 13,14 which extend rearwardly and constitute two spaced tail booms 15,16. Wings 17, provided with ailerons and flaps, extend to either side of the aircraft over the top of the engine nacelles 13,14, and are faired into the nacelles 13,14 and tail booms 15,16.

Each tail boom 15,16 is provided, at its rearmost end, with one half of a horizontal tail surface 18 and a tail fin and rudder 19. The rearmost end of the tail booms 15,16 are not connected together although in some arrangements either the tail booms 15,16 or the tail fins 19 may be connected together by an aero dynamic shaped horizontal fin or strut (not shown).

The aircraft is propelled by two gas turbine engines 20, of the bypass type, disposed one in each of the two nacelles 13,14. The engines 20 are thus spaced apart to either side of the longitudinal center-line of the aircraft. The engines 20 receive air from air intakes 21 located each side of the nose portion 11 of the aircraft. The intakes 21 comprise side inlets 22,23 having variable geometry supersonic compression ramps 24 vertically disposed to afford the pilot good downward visibility. The ramps 24 could be horizontal if desired. The engines may be parallel to each other (as shown in FIG. 1) or their axes may intersect rearwardly of the front nose 11 (as shown in FIG. 6).

The engines 20 comprise a bypass air compressor 25 driven by a turbine, generally indicated at 26. The compressed bypass air is directed to discharge nozzles 27 located adjacent to the longitudinal center-line of the aircraft.

The efflux of exhaust gases from the engines is discharged through turbine exhaust nozzles 28 located to the rear of the nose portion 11 of the aircraft at a location between the tail booms 15,16.

As can be seen more clearly in FIGS. 1 and 2, the bypass air discharge nozzles 27 are disposed ahead of, but slightly below, the turbine exhaust nozzles 28 so that both can discharge simultaneously through the tunnel defined between the tail booms 15,16 and the underside of the central portion of the wings 17. This brings the positive advantage that the infra-red signature of the aircraft is only readily visible to an infra-red seeking missile approaching from directly behind the aircraft. It will be noted that the bypass air nozzles comprise a pair of swivellable pipe bend nozzles 27, each capable of pivoting about a respective swivel bearings 29 connected to the bypass duct of the engine 20. The range of pivoted movement of the bearings 29 allows the nozzles 27, to be directed either rearwardly for forward flight, downwardly, for vertical take-off, slightly forwardly to achieve a degree of deceleration. In contrast the turbine exhaust nozzles 28 are elongate nozzles lying one above the other and extend substantially the whole separation of the two tail booms 15,16. The nozzles 28 are pivotable together in unison about swivel bearings 31 through a range of positions allowing rearward, downward, or slightly forward discharge for forward flight, vertical take-off or landing and deceleration respectively. The nozzles 28 are each provided with means for varying the area of its outlet opening.

From FIG. 3, (left-hand side) it will be seen that between the two round profiles of the individual swivellable bypass air discharge nozzles 27, there is a dead space 32 which it would be preferably to avoid. The arrangement is however advantageous in that the round sections of the individual nozzles 27 enables them to carry the high pressures as hoop tension using relatively light-weight structure, and furthermore many of the well-known types of variable area discharge outlets, such as for example, as is shown in British Pat. No. 1,177,954 can be used at the end of the nozzles 28.

The dead space 32 can be filled with air to reduce base drag by bleeding boundary layer air from the adjacent air intakes through air passages 33 located each side of the nose portion 11 of the aircraft (see FIG. 1).

The bypass air discharge nozzles are each provided with variable area outlets so as to realise additional thrust available by burning fuel in the bypass air flow, sometimes referred to as plenum chamber burning (PCB mode).

Figure 4:
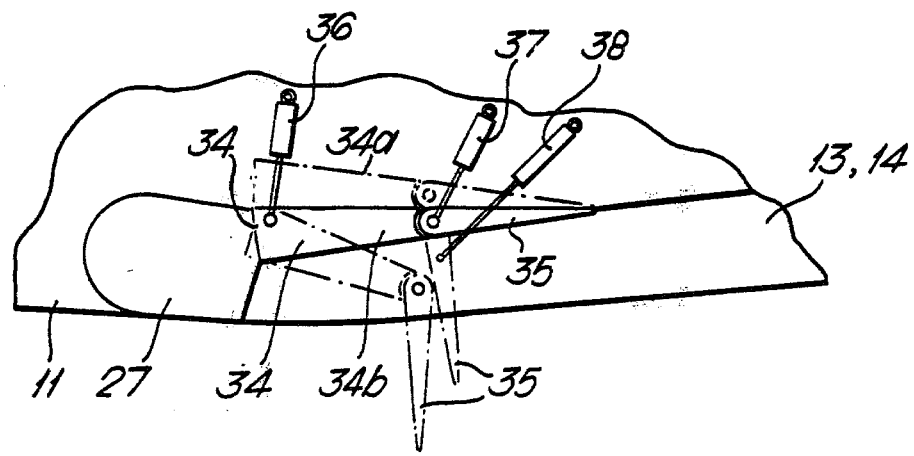
FIG. 4 is a schematic illustration of an alternative design of a vectored thrust bypass air discharge nozzle means to that shown on the aircraft of FIGS. 1 to 3, constructed in accordance with the present invention.

The tunnel formed by the central portion of the wing 17 and the two booms 15,16 can provide a good air flow passage, therefore, an alternative arrangement for varying the area of the outlets of the nozzles 27 and for varying the direction of thrust may employ fixed rearwardly directed nozzles and movable flaps and ramps located in the air stream as shown in FIG. 4.

Referring to FIG. 4, the nozzles 27 are fixed and a ramp 34 is provided for reducing the area of the outlet of the nozzles 27. The ramp 34 has pivotted to its rearmost edge a flap 35, and hydraulic rams 36,37 and 38 are provided for moving the ramp 34 and flap 35 from the stowed position 34a (shown dotted) to the position 34b for directing the air rearwardly (shown in solid line). The stowed position 34a is the position usually employed when operating in the plenum chamber burning mode. The area of the outlet of the nozzles 27 is reduced by operating ram 36 so that the front of ramp 34 obturates part of the nozzle outlet. Vertical thrust is achieved by operating ram 38 to point the flap 35 downwards or, when operating in the PCB mode, by moving the rear edge of ramp 34 downwards and pointing the flap 35 downwards (as shown chain dotted).

In an alternative arrangement the two bypass air nozzles 27 may be replaced by a single swivellable nozzle or a fixed nozzle having ramps and flaps similar to that shown in FIG. 4.

Figure 5:
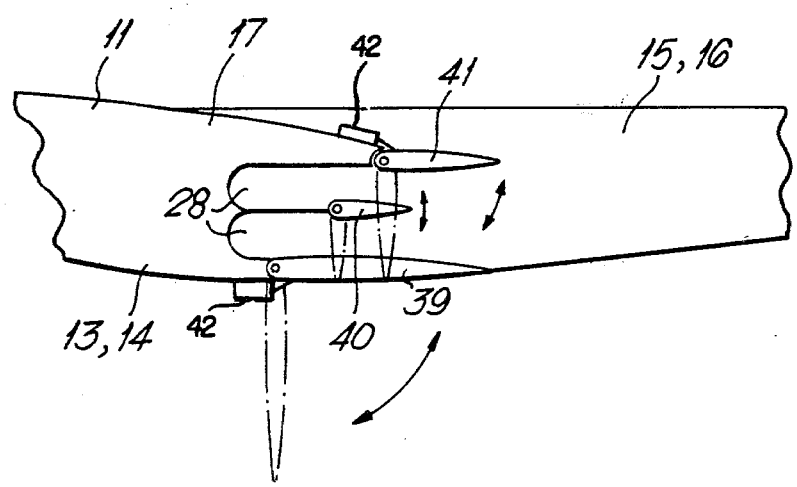
FIG. 5 is a schematic illustration of an alternative design of turbine exhaust nozzle means to that shown in FIGS. 1 to 3, constructed in accordance with the present invention.

If desired the turbine exhaust nozzles may be replaced by one or two fixed rearwardly directed nozzles and the direction of thrust and area of the nozle outlet may be varied by means of flaps as shown in FIG. 5.

Referring to FIG. 5, there is shown a pair of turbine exhaust nozzles 28, one above the other, the rearmost edges of which terminate along a line which lies at an acute angle to the longitudinal axis of the aircraft.

Three flaps 39,40,41, are pivotally mounted at their leading edges on the rear edges of the nozzles 28. The two outermost flaps 39,41 are provided with actuators 42 to move them together in unison from a position where the efflux of gases is discharged predominantly rearwards, to provide forward thrust, to a position where the efflux is discharged downwards or slightly forwards (indicated by the dotted outlines). The central flap 40 is freely pivoted and assumes a position dictated by the gas flow through the nozzles 28. In the event of one engine failing, the flap 40 is deflected to close off the jet pipe of that engine. Differential movement of the actuators may be used to reduce the area between the free ends of flaps 39,41 to maintain a reduced area exit nozzle. With the flaps in the downward position the lowermost flap 39 may be used to deflect air issuing from rearwardly directed bypass air discharge nozzles 27 in a downwards direction to augment vertical thrust. Alternatively, differential movement of the actuators can be used to increase the area between the trailing edges of the flaps 39 and 41 so that the flaps act as thrust spoilers and air brakes.

It will be appreciated that the nozzle variants described can be used as either the bypass air discharge nozzle means or the turbine exhaust nozzle means, or if only a turbojet engine is used and only one nozzle means is present, this single nozzle means can be of any of the various forms described. It is also contemplated that the bypass air could be discharged alongside the turbine exhaust gases through a single nozzle which discharges along a tunnel between the two engines.

In particular it will be appreciated by those skilled in the art that the aircraft of the present teaching allows a large volume of fuel to be carried near the center of gravity of the aircraft and would allow a single set of accessories to be positioned so that they may be driven by one or both engines.

The wings 17 may be of the canard type as shown in the accompanying drawings. Alternatively, the wings 17 could be of delta shape. The tail plane 18 may be embodied in the wing shape and the wing provided with elevrons.

The engines 20 may lie substantially parallel when viewed in plan, or their central axes may lie on converging axes.

Furthermore, in the case where the nozzles 27 or 28 are swivellable, a flap 50 may be provided in the top surface of wing 17 immediately above the nozzles. The flap 50 (shown in FIG. 1) may be movable with each nozzle, or movable independantly of the nozzles. The flaps 50 enable downward flowing air to pass through an opening formed by moving the flap 50. In this way the downward thrust produced on the top surface of the wing on vertical take-off and landing by the entrained air can be greatly reduced. The flap 50 may also constitute an air brake.

The nozzles of both engines may be operated by a single system supplied by both, or either, engines for simplicity and reliability.

In the case where the efflux of gases from both engines is discharged from a single nozzle means may be provided to reduce the area of the nozzle outlet in the event of one of the engines failing.

The aircraft of FIG. 1 may be provided with a crossover-bleed system whereby pressurised air, or turbine exhaust, from each engine can be bled-off to wing tip, nose and tail boom ends of the aircraft. Such a system is shown chain dotted in FIG. 1 where it will be seen that the left hand engine supplies the discharge ports at the nose 44, right hand wing tip 45, and right hand tail boom 46 whereas the right hand engine supplies the discharge ports at the nose 44, left hand wing tip 47 and left hand tail boom 48.

I claim:

1. An aircraft capable of vertical or short take-off and landing comprising:
    a rearwardly bifurcated fuselage comprising a front nose portion extending along the longitudinal center-line axis of the aircraft and two spaced engine nacelles which extend rearwardly to comprise two spaced tail booms:
    a gas turbine engine located within each nacelle;
    a plurality of turbine exhaust nozzles located to the rear of the nose portion and between the tail booms, said plurality of turbine exhaust nozzles are located in close proximity to the longitudinal center-line of said aircraft, and an efflux of gases from said gas turbines is discharged through said plurality of turbine nozzles to provide a propulsive thrust; and
    means to vary the direction of the thrust.

2. An aircraft according to claim 1 wherein there is one turbine exhaust nozzle from which the combined efflux of gases from both gas turbines are discharged.

3. An aircraft according to claim 1 wherein each engine has a turbine exhaust nozzle and the two turbine exhaust nozzles are positioned adjacent to one another.

4. An aircraft according to claim 1 wherein the plurality of turbine exhaust nozzles are swivellable and said means to vary the direction of thrust does so by swivelling the plurality of nozzles.

5. An aircraft according to claim 3 wherein both of the turbine exhaust nozzles are swivellable and means are provided for swivelling both nozzles together in unison.

6. An aircraft according to claim 1 wherein the plurality of turbine exhaust nozzles are substantially centered on the longitudinal center-line of the aircraft.

7. An aircraft according to claim 1 wherein the engines are bypass gas turbine engines, further comprising a plurality of bypass air discharge nozzles provided at a region adjacent the longitudinal center-line of the aircraft through which bypass air is discharged to provide a propulsive thrust, and means to vary the direction of the thrust produced by the discharge of bypass air.

8. An aircraft according to claim 7 wherein there is one bypass air discharge nozzle from which the combined flows of bypass air from both engines is discharged.

9. An aircraft according to claim 7 wherein each gas turbine has its own bypass air discharge nozzle, said plurality of bypass air discharge nozzles are positioned adjacent each other.

10. An aircraft according to claim 7 wherein the plurality of bypass air discharge nozzles are swivellable and said means to vary the direction of bypass thrust does so by swivelling the bypass nozzles.

11. An aircraft according to claim 9 wherein both bypass air discharge nozzles are swivellable and said means to vary the bypass thrust direction swivels them together in unison.

12. An aircraft according to claim 7 wherein the turbine exhaust nozzles and the bypass air discharge nozzles are swivellable and said turbine nozzle swivel means and said bypass nozzle swivel means swivel all the nozzles together in unison.

13. An aircraft according to claim 7 wherein said gas turbines are provided with means for burning fuel in the bypass duct thereby to augment the thrust produced by discharging the mixture of combustion products of the fuel and bypass air through the bypass air discharge nozzles, and means are provided to vary the outlet area of the plurality of bypass air discharge nozzles.

14. An aircraft according to claim 13 wherein the plurality of bypass air discharge are fixed, said means to vary the bypass thrust direction comprises flap means provided in the path of the air issuing from the plurality of bypass air nozzles, and a further flap is provided in the path of the air issuing from said bypass air nozzles, said further flap being movable to and from a first position where the further flap partly obturates the outlet of the plurality of nozzles and movable to and from a second position where the area of the outlet nozzle is greater than when the flap is in said first position.

15. An aircraft according to claim 1 or claim 7 wherein the plurality of turbine exhaust nozzles are fixed and flap means are provided in the path of the gases issuing from the plurality of nozzles thereby to deflect the gases to vary the direction of the thrust produced.

16. An aircraft according to claim 1 or claim 7 wherein the plurality of bypass air discharge nozzles are fixed and said means to vary the bypass thrust direction comprises flap means provided in the path of the air issuing from the plurality of nozzles to deflect the bypass air.

17. An aircraft according to claim 1 wherein said gas turbines lie parallel to one another and the turbine exhaust nozzle means is positioned between vertical planes which include the center-line axes of the engines and a plurality of bent duct means receive the exhaust gases from the engines and direct them to the plurality of turbine exhaust nozzles.

18. An aircraft according to claim 1 wherein the engines are aligned with their longitudinal axes in planes which converge to the rear of the nose portion, and the plurality of turbine exhaust nozzles are arranged to direct a propulsive thrust in a plane extending along the longitudinal center line of the aircraft.

19. An aircraft according to claim 1, wherein the plurality of turbine exhaust nozzles are adjacent to the longitudinal center-line of the aircraft.

20. An aircraft capable of vertical and short takeoff and landing comprising:
 a rearwardly bifurcated fuselage comprising a front nose symmetrical about the vetical center-plane of said aircraft, two engine nacelles being the branches of said bifurcated fuselage, and two tail booms comprising the rearward portion of said nacelles, said tail booms being substantially coaxial to said nacelles;
 each of said nacelles enclosing a bypass gas turbine engine;
 a plurality of turbine exhaust nozzles located behind said front nose and between said tail booms through which an efflux of gases from said gas turbines is discharged to produce a propulsive thrust;
 means to vary the direction of the thrust produced from said turbine exhaust nozzles;
 a plurality of bypass air discharge nozzles adjacent to the longitudinal center-line of said aircraft and slightly rearward of the center of said aircraft, bypass air is discharged through said bypass nozzles to produce propulsive thrust; and,
 means to vary the direction of the thrust from said bypass air nozzles.

* * * * *